(12) United States Patent
Zarubica et al.

(10) Patent No.: US 10,690,780 B1
(45) Date of Patent: Jun. 23, 2020

(54) SELF-CALIBRATING ANGLE OF ARRIVAL SYSTEM

(71) Applicant: L3 Technologies, Inc., New York, NY (US)

(72) Inventors: Radivoje Zarubica, Salt Lake City, UT (US); Samuel C. Kingston, Salt Lake City, UT (US); Larry S. Thomson, Salt Lake City, UT (US); Bing Shen, Salt Lake City, UT (US)

(73) Assignee: L3 Technologies, Inc., New York, NY (US)

( * ) Notice: Subject to any disclaimer, the term of this patent is extended or adjusted under 35 U.S.C. 154(b) by 336 days.

(21) Appl. No.: 15/787,548

(22) Filed: Oct. 18, 2017

(51) Int. Cl.
*G01S 19/40* (2010.01)
*G01S 19/23* (2010.01)
*G01S 19/32* (2010.01)
*G01S 19/49* (2010.01)

(52) U.S. Cl.
CPC ............ *G01S 19/40* (2013.01); *G01S 19/235* (2013.01); *G01S 19/32* (2013.01); *G01S 19/49* (2013.01)

(58) Field of Classification Search
None
See application file for complete search history.

(56) References Cited

U.S. PATENT DOCUMENTS

| | | | | |
|---|---|---|---|---|
| 2011/0074633 | A1* | 3/2011 | Pun | G01S 3/043 342/442 |
| 2011/0260911 | A1* | 10/2011 | Sapp | G01S 3/10 342/156 |
| 2019/0178985 | A1* | 6/2019 | Roh | G01S 7/295 |

\* cited by examiner

*Primary Examiner* — Whitney Moore
(74) *Attorney, Agent, or Firm* — Kirton McConkie; Brian Tucker

(57) ABSTRACT

An angle of arrival system can be self-calibrating. The angle of arrival system can continuously estimate imperfections caused by the analog RF components and dynamically apply corrections based on these estimates. As a result, an angle of arrival system can employ inexpensive components, will not require factory calibration, but can still perform geolocation with high precision.

20 Claims, 6 Drawing Sheets

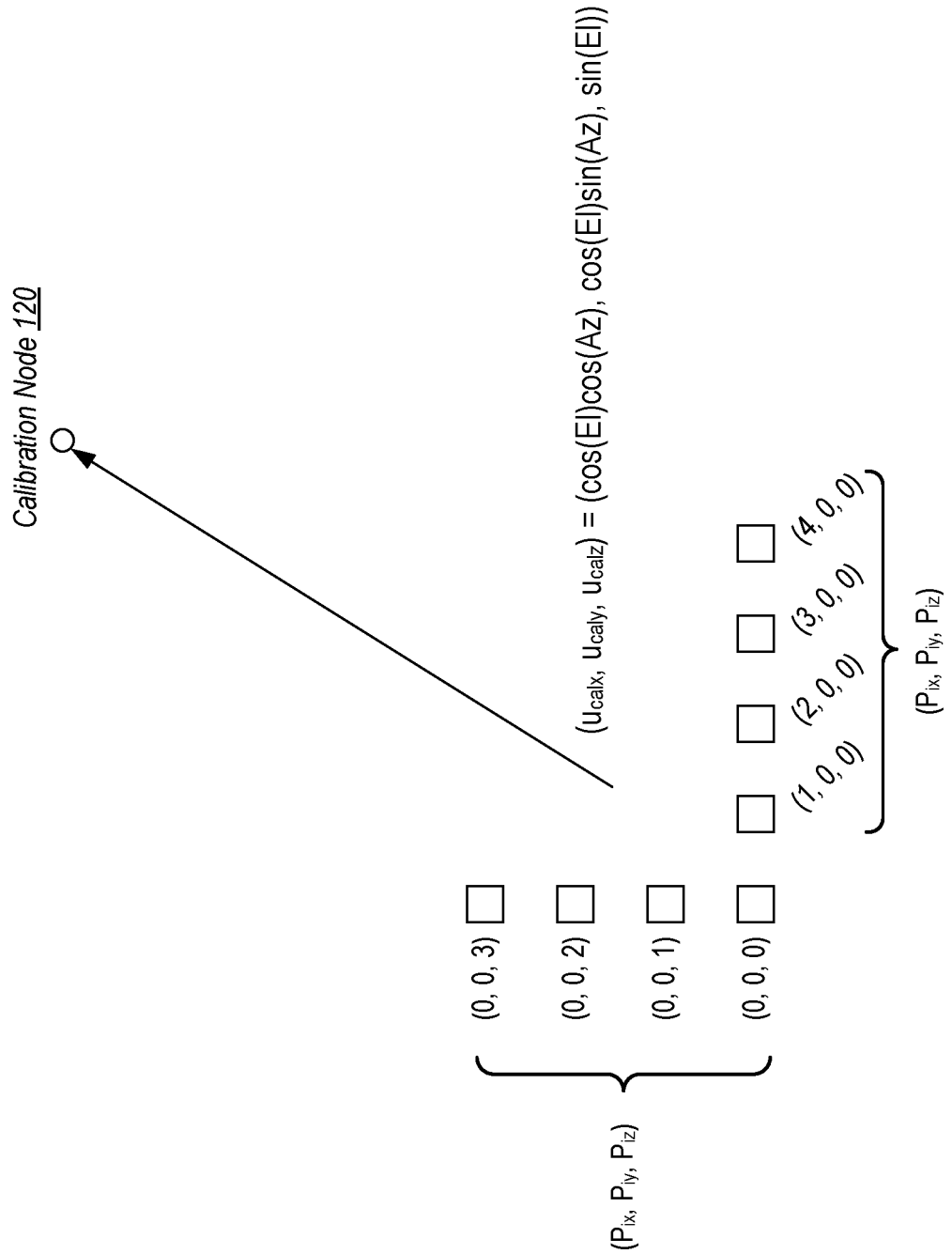

SELF-CALIBRATING ANGLE OF ARRIVAL SYSTEM

CROSS-REFERENCE TO RELATED APPLICATIONS

N/A

BACKGROUND

Geolocation refers to techniques for determining the geographic location of an object. Various types of geolocation exist. The present invention is applicable to environments where the object to be geolocated emits a signal. In such environments, various measurements can be performed on the received signal to estimate the location of the emitting object. For example, a receiver can perform angle (or direction) of arrival techniques to estimate the angle between the emitting object and the boresight vector of the antenna's receiver.

Angle of arrival techniques are often performed by detecting phase differences at a number of antennas that receive the signal emitted by the object. In such systems, each antenna is coupled to the system via various analog RF components (e.g., LNAs, up/down converters, cables, etc.) whose characteristics vary with temperature and frequency (i.e., they will cause an unknown phase rotation between the antenna and the angle of arrival system). The characteristics will also vary between components of the same type. For example, multiple RF cables, even if they have the same length, will rarely cause the same phase shift to a signal. Due to these variations and inconsistencies, it can be difficult to estimate the angle of arrival with high precision.

Generally, there are two options for addressing the phase rotation caused by these RF components. First, specialized RF components that minimize the effects of temperature and frequency on the system can be employed. However, such components are expensive and still do not fully compensate for temperature- and frequency-based variations. Second, specialized measuring equipment can be employed to measure the phase rotation caused by the RF components. However, this type of calibration would require disconnecting the antenna array from the angle of arrival system and is therefore unfeasible in many scenarios.

BRIEF SUMMARY

The present invention extends to an angle of arrival system that is self-calibrating. The angle of arrival system can continuously estimate imperfections caused by the analog RF components and dynamically apply corrections based on these estimates. As a result, an angle of arrival system can employ inexpensive components, will not require factory calibration, but can still perform geolocation with high precision.

In one embodiment, the present invention is implemented by an angle of arrival node in an angle of arrival system as a method for estimating an angle of arrival of a signal emitted by a node at an unknown location. A first signal, which is emitted by a calibration node having a known location relative to the antenna array, can be received at each of a plurality of antennas of the antenna array. The antennas are coupled to a modem via an RF chain. The modem can generate a first covariance matrix representing the phase differences of the first signal received at each of the antennas. Based on the known location of the calibration node, the modem can calculate a correction matrix that represents phase rotation caused by the RF chain. A second signal, which is emitted by a node at an unknown location, can be received at each of the plurality of antennas of the antenna array. The modem can generate a second covariance matrix representing the phase differences of the second signal received at each of the antennas. The modem can then apply the correction matrix to the second covariance matrix to remove the phase rotation caused by the RF chain.

In another embodiment, the present invention is implemented as an angle of arrival system that includes: an angle of arrival node that includes an antenna array, a modem, and an RF chain that couples each antenna of the antenna array to the modem; and a calibration node that is configured to emit a calibration signal for reception by the antenna array. The angle of arrival node is configured to generate, based on a known location of the calibration node and the received calibration signal, a correction matrix that represents phase rotation caused by the RF chain. The angle of arrival node is further configured to calculate a covariance matrix for a signal received from a node at an unknown location and to apply the correction matrix to the covariance matrix to remove the phase rotation caused by the RF chain.

In another embodiment, the present invention is implemented, by an angle of arrival node in an angle of arrival system, as a method for estimating an angle of arrival of a signal emitted by a node at an unknown location. A first signal, which is emitted by a calibration node having a known location relative to the antenna array, can be repeatedly received at each of a plurality of antennas of the antenna array. The antennas are coupled to a modem via an RF chain. The modem can repeatedly generate a first covariance matrix representing the phase differences of the first signal received at each of the antennas. Based on the known location of the calibration node, the modem can repeatedly calculate a correction matrix that represents a current phase rotation caused by the RF chain. A second signal, which is emitted by a node at an unknown location, can be received at each of the plurality of antennas of the antenna array. The modem can generate a second covariance matrix representing the phase differences of the second signal received at each of the antennas. The modem can then apply the correction matrix that represents the current phase rotation caused by the RF chain to the second covariance matrix.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIG. 2 provides an example of how a covariance matrix that corresponds to the phase difference due to the angle to the calibration node can be calculated.

DETAILED DESCRIPTION

Figure 1:
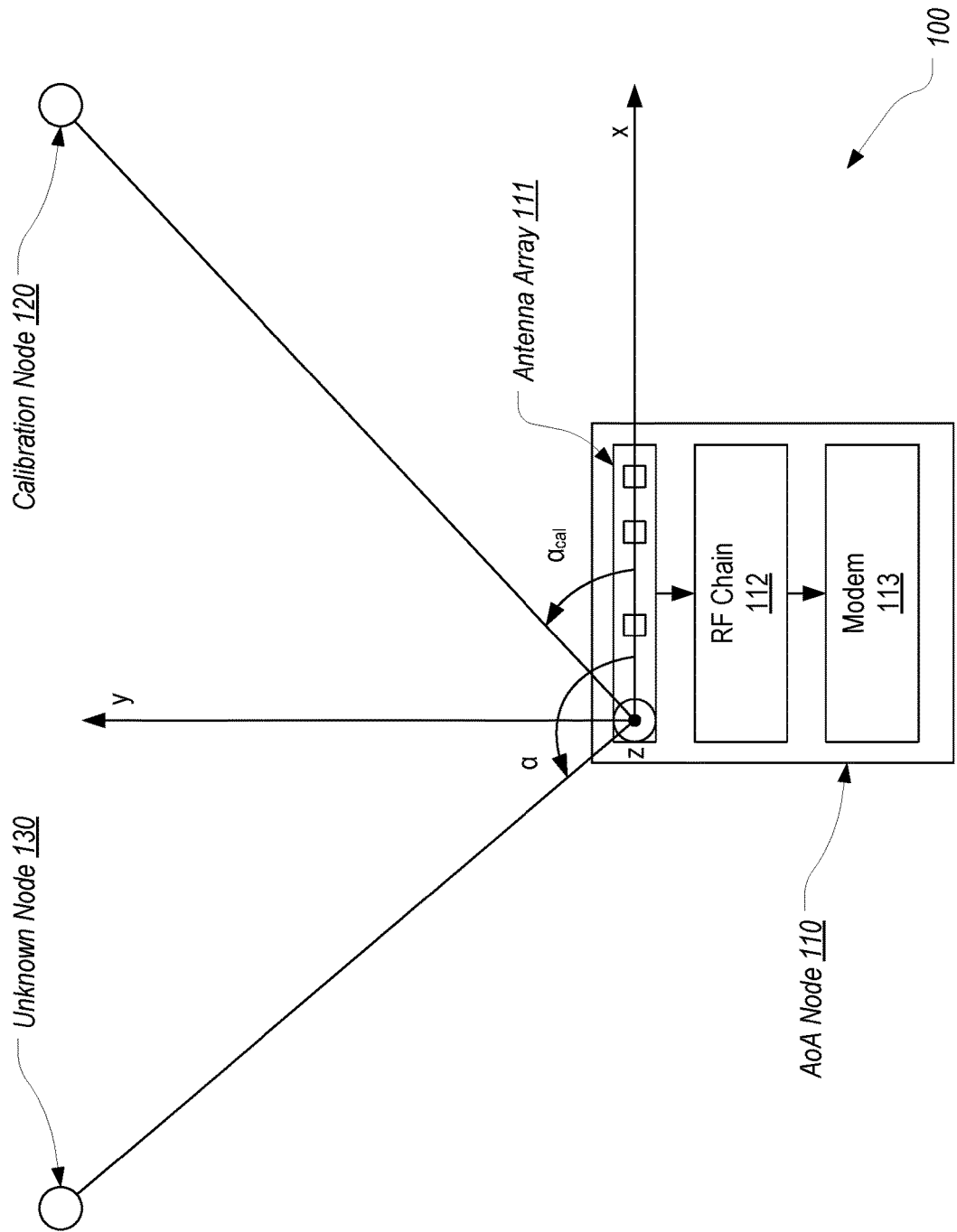
FIG. 1 illustrates an example angle of arrival system that is configured in accordance with embodiments of the present invention.
Figure 1A:
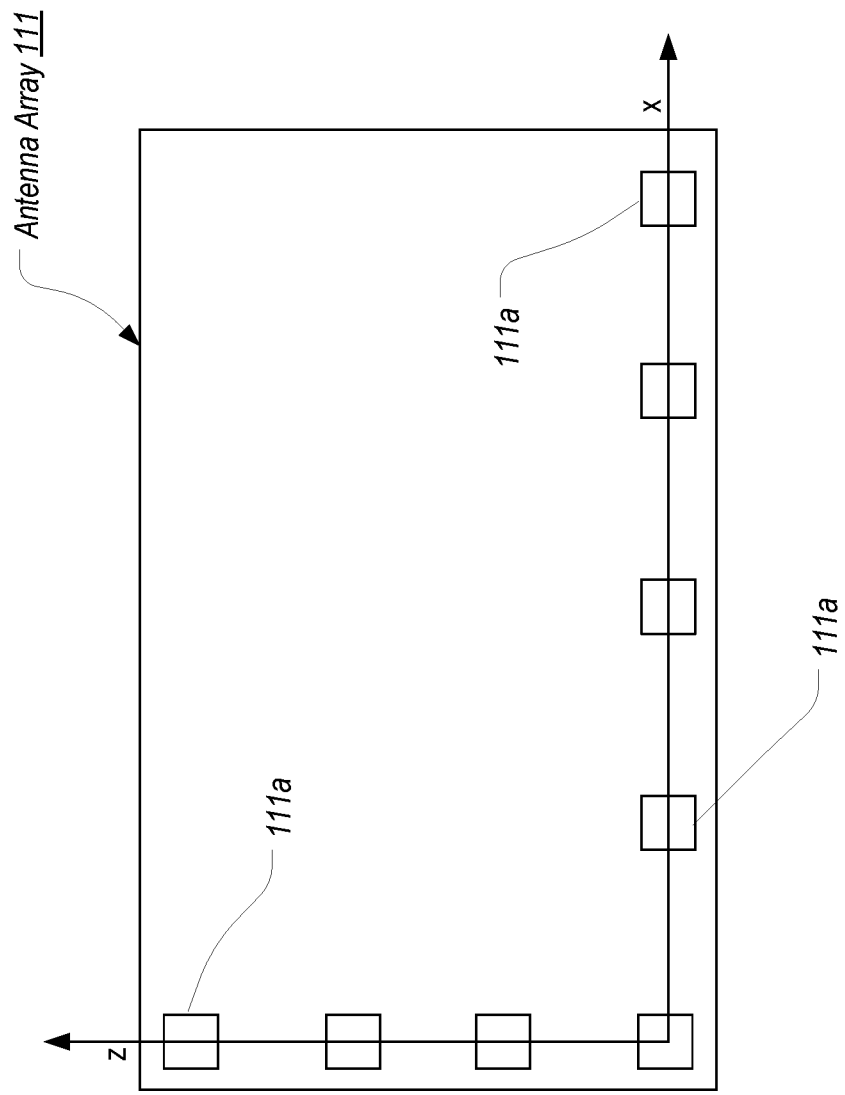
FIG. 1A illustrates one example configuration of an antenna array that can be employed in the angle of arrival system.

FIG. 1 generally illustrates the architecture of an angle of arrival system 100 that is configured in accordance with embodiments of the present invention. Angle of arrival system 100 includes an angle of arrival node 110 that functions as a receiver for detecting an emitted signal and estimating an angle of arrival of the signal based on phase differences detected at the various antennas of an antenna array 111. By way of example only, FIG. 1A illustrates one of many possible configurations of antennas 111a in antenna array 111. Antenna array 111 can include any reasonable number of antennas 111a which can be positioned in any desirable pattern/orientation to obtain a particular field of view, sensitivity, etc.

As is known in the art, a modem 113 can be employed to perform the angle of arrival measurements. The term "modem" should be construed as any device that can sample a signal and create a covariance matrix. An RF chain 112 consisting of a number of analog RF components are employed to couple antenna array 111 to modem 113. As mentioned in the background, RF chain 112 will introduce an unknown phase rotation to the signal received at antenna array 111 and the amount of this phase rotation will vary with temperature and operating frequency or due to degradation of the components over time.

In accordance with embodiments of the present invention, angle of arrival system 100 can be configured as a self-calibrating system to dynamically calculate and account for the phase rotation caused by RF chain 112. To implement this self-calibration, angle of arrival system 100 employs a calibration node 120. The term calibration node should be construed as an object that is positioned at a known location relative to angle of arrival node 110 and that emits a signal for angle of arrival node 110 to receive.

With reference to FIG. 1, the known location of calibration node 120 is relative to the boresight vector of antenna array 111. For simplicity, it will be assumed in FIG. 1 that the boresight vector (which, in the case of a plane wave and planar antenna, would be the direction that produces zero phase difference between antennas 111a) is parallel with the y axis. It will also be assumed that elevation is defined by the x-z plane while azimuth is defined by the x-y plane. Therefore, it can be assumed that the location of calibration node 120 relative to the boresight vector of antenna array 111 ($\alpha_{cal}$) is 43° azimuth and 0° elevation. Of course, this location is intended as an example only and calibration node 120 could be positioned at any known location within antenna array 111's field of view. The location of calibration node 120 relative to the boresight vector of antenna array 111 can be determined in any suitable manner. For example, surveying techniques could be employed to precisely determine the azimuth and elevation angles between calibration node 120 and the boresight vector of antenna array 111.

As an overview, by knowing the location of calibration node 120, or more specifically, by knowing the angle of arrival of a signal emitted by calibration node 120, angle of arrival node 110 can dynamically calculate the phase rotation that is currently being caused by RF chain 112. Then, angle of arrival node 110 can calculate the angle of arrival of a signal emitted by a node at an unknown location ("unknown node 130") and self-calibrate to account for the phase rotation caused by RF chain 112 to thereby produce a highly accurate estimate of the angle. Because angle of arrival node 110 self-calibrates to remove the phase rotation caused by RF chain 112, there is no need to perform a factory calibration on angle of arrival system 100 and it allows inexpensive components (which may cause relatively significant variations in phase rotation) to be employed within RF chain 112.

This self-calibration process can be performed by modem 113 in various steps. First, modem 113 can generate a covariance matrix $R_{cal}$ from measurements of the signal emitted by calibration node 120. In other words, a signal emitted by calibration node 120 can be received at each antenna 111a of antenna array 111, provided to modem 113 via RF chain 112, and processed by modem 113 to calculate the covariance matrix representing the phase of the signal at each antenna 111a. Since one of skill in the art would understand how to calculate a covariance matrix for a signal received at an antenna array, this process will not be described. Suffice it to say that this covariance matrix, $R_{cal}$, will include a component ($R\alpha$) that corresponds to the phase differences due to the angle ($\alpha_{cal}$) of calibration node 120 relative to the boresight vector and a component ($R_{RF}$) that corresponds to the unknown phase rotations caused by RF chain 112.

Because modem 113 knows precisely where calibration node 120 is, it can calculate $R\alpha$—the component of the covariance matrix that corresponds to the phase differences due to the angle $\alpha_{cal}$—as follows:

$$R_\alpha = G_{cal} G_{cal}^H$$

$$G_{cal} = \begin{bmatrix} g_{cal1} \\ g_{cal2} \\ \vdots \\ g_{cali} \\ g_{calN} \end{bmatrix}, G_{cal}^H = [\, g_{cal1}^* \;\; g_{cal2}^* \;\; \cdots \;\; g_{cali}^* \;\; g_{calN}^* \,]$$

where N is the number of antenna elements and * represents conjugation. Each element $g_{cali}$ in the $G_{cal}$ vector is calculated as:

$$g_{cali} = e^{-j2\pi(P_{ix},P_{iy},P_{iz})\cdot(u_{calx},u_{caly},u_{calz})}$$

where ($P_{ix}$, $P_{iy}$, $P_{iz}$) is the location of the $i^{th}$ antenna element while ($u_{calx}$, $u_{caly}$, $u_{calz}$) is the vector pointing to the calibration node calculated as:

$$(u_{calx},u_{caly},u_{calz}) = (\cos(El)\cos(Az),\, \cos(El)\sin(Az),\, \sin(El))$$

For example, FIG. 2 illustrates a simplified example where antenna array 111 includes eight antennas 111a that are spaced along the x and z axes as indicated. Assuming calibration node 120 is located at 45° Azimuth and 60° Elevation, the vector pointing to calibration node 120 would be (cos(60)cos(45), cos(60)sin(45), sin(60))=(0.738, 0.738, 0.866) relative to the boresight vector of antenna array 111 which is assumed to originate at point (0, 0, 0). In short, modem 113 can calculate the phase shift that will exist at each antenna 111a when a signal arrives at angle $\alpha_{cal}$ which is the known angle of arrival for the signal emitted by calibration node 120.

Once modem 113 generates the covariance matrix $R_{cal}$ from measurements of the signal emitted by calibration node 120 and calculates the covariance matrix $R_\alpha$ based on the known location of calibration node 120, modem 113 can then calculate the covariance matrix, $R_{RF}$, that is due to the unknown phase rotation in RF chain 112 as follows:

$$R_{RF} = R_{cal} \cdot R_\alpha^*$$

where · denotes an element by element product (as opposed to a matrix product) and * represents conjugation.

From the covariance matrix, $R_{RF}$, modem 113 can then calculate a correction matrix, $R_{cor}$, by taking the first column from $R_{RF}$ to create a vector C and then normalizing each element in C to create the vector $C_N$ as follows:

$$C = R_{RF}(:,1)$$
$$C_N = \frac{C}{\text{abs}(C)}$$

The correction matrix, $R_{cor}$, is then calculated as:

$$R_{cor} = (C_N C_N^H)^*$$

where $C_N^H$ is the conjugate transpose of $C_N$ and * represents conjugation.

Finally, with the correction matrix calculated, modem 113 can apply calibration to a signal received from unknown node 130 to account for the phase rotation that is currently being caused by RF chain 112. In particular, modem 113 can generate a covariance matrix, $R_{node}$, from a signal received from unknown node 130 and can then multiply each element in $R_{node}$ with the corresponding element in the correction matrix $R_{cor}$ (e.g., by multiplying the element at position 1, 1 in $R_{node}$ with the element at position 1, 1 in $R_{cor}$) to generate a corrected covariance matrix, $R_{node\_cor}$. This corrective process, in essence, removes from $R_{node}$ the phase rotation that is caused by RF chain 112. The corrected covariance matrix, $R_{node\_cor}$, can then be used to calculate the angle of arrival α using any suitable angle of arrival algorithm. Because of the self-calibration process, the estimated angle of arrival α will not be affected by the phase rotation caused by RF chain 112 even when this phase rotation varies due to temperature and operating frequency fluctuations.

Figure 3A:
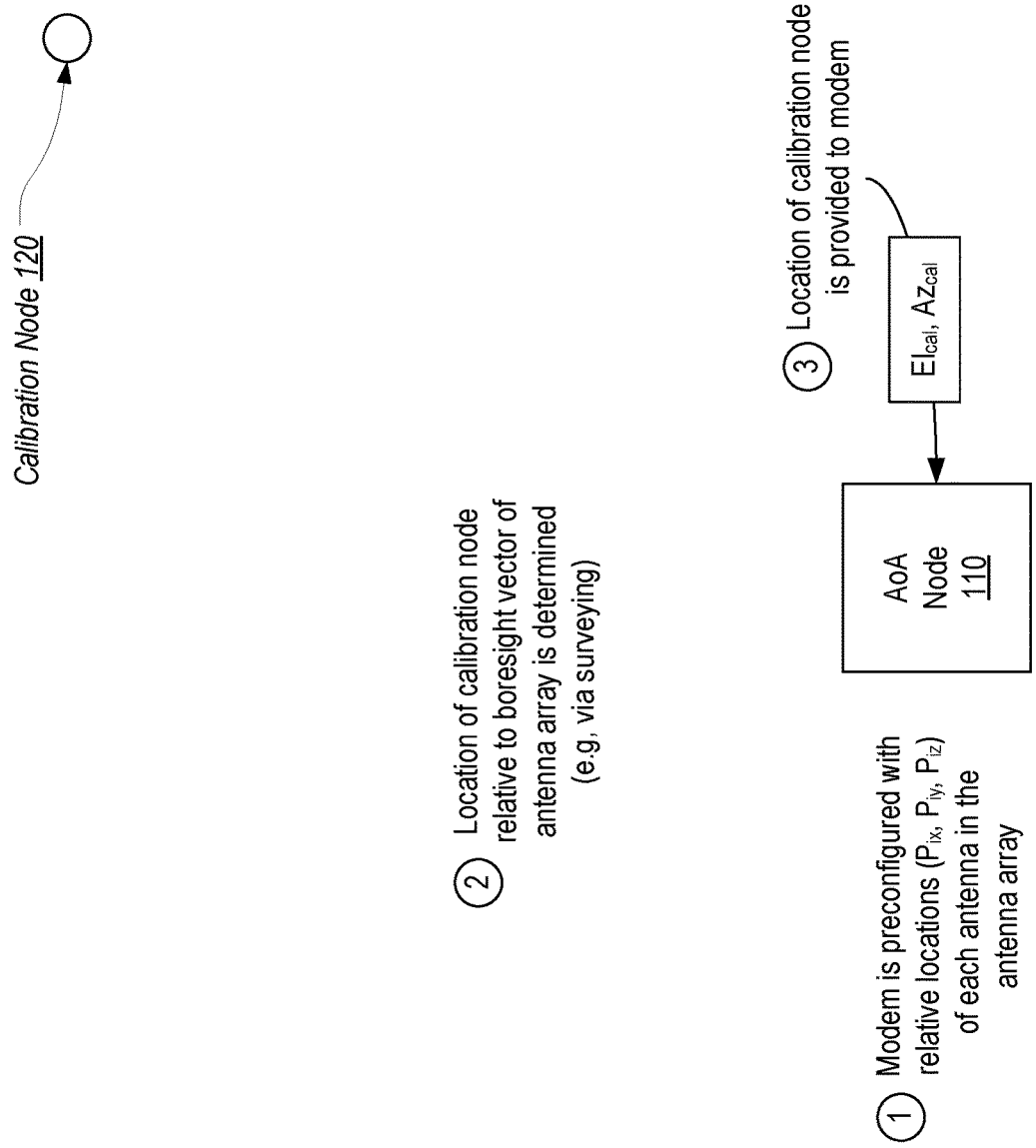
FIGS. 3A-3C illustrate an example of the self-calibration process that a modem can perform to dynamically account for phase rotation caused by RF components in an angle of arrival system.
Figure 3B:
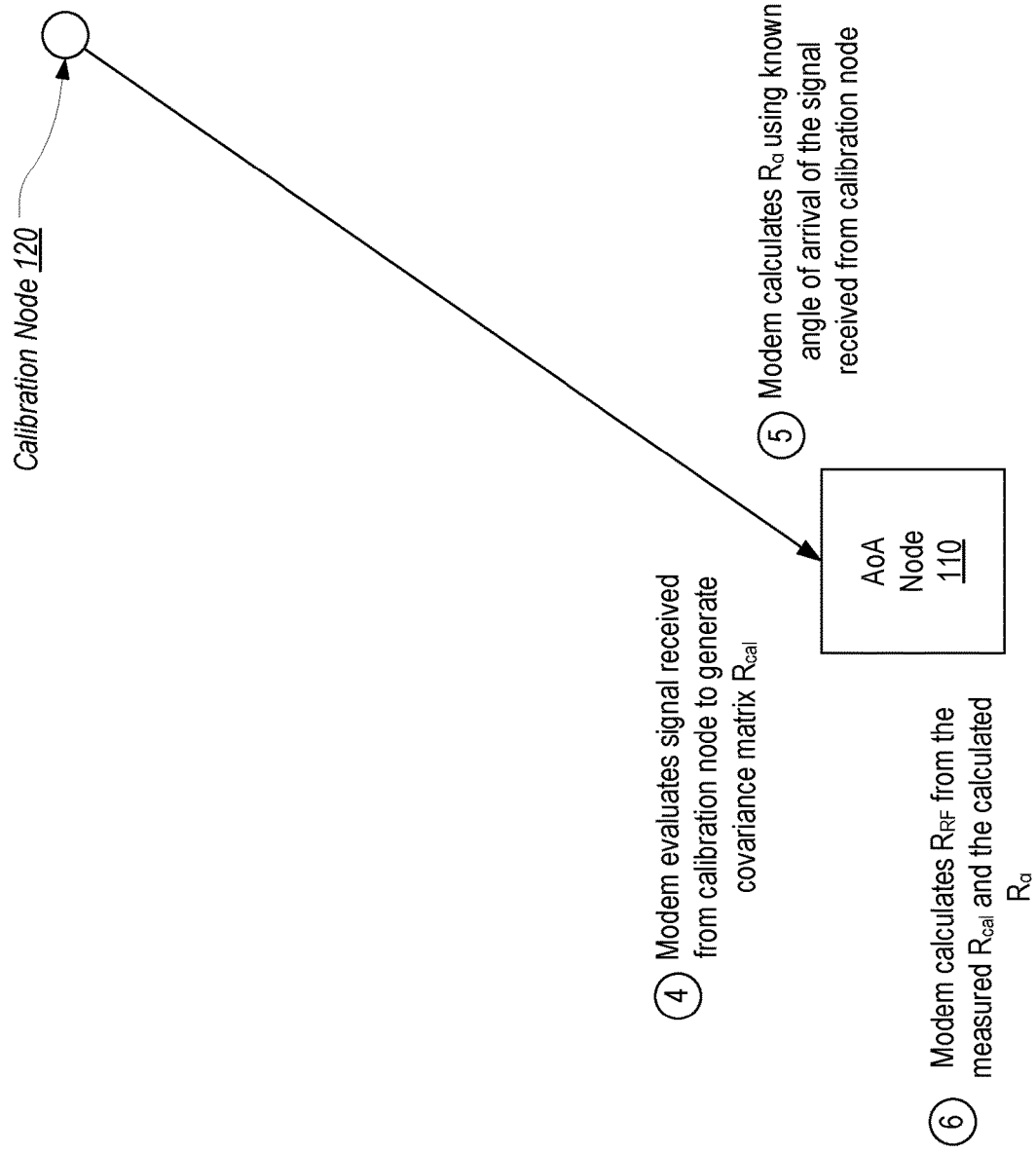
Figure 3C:
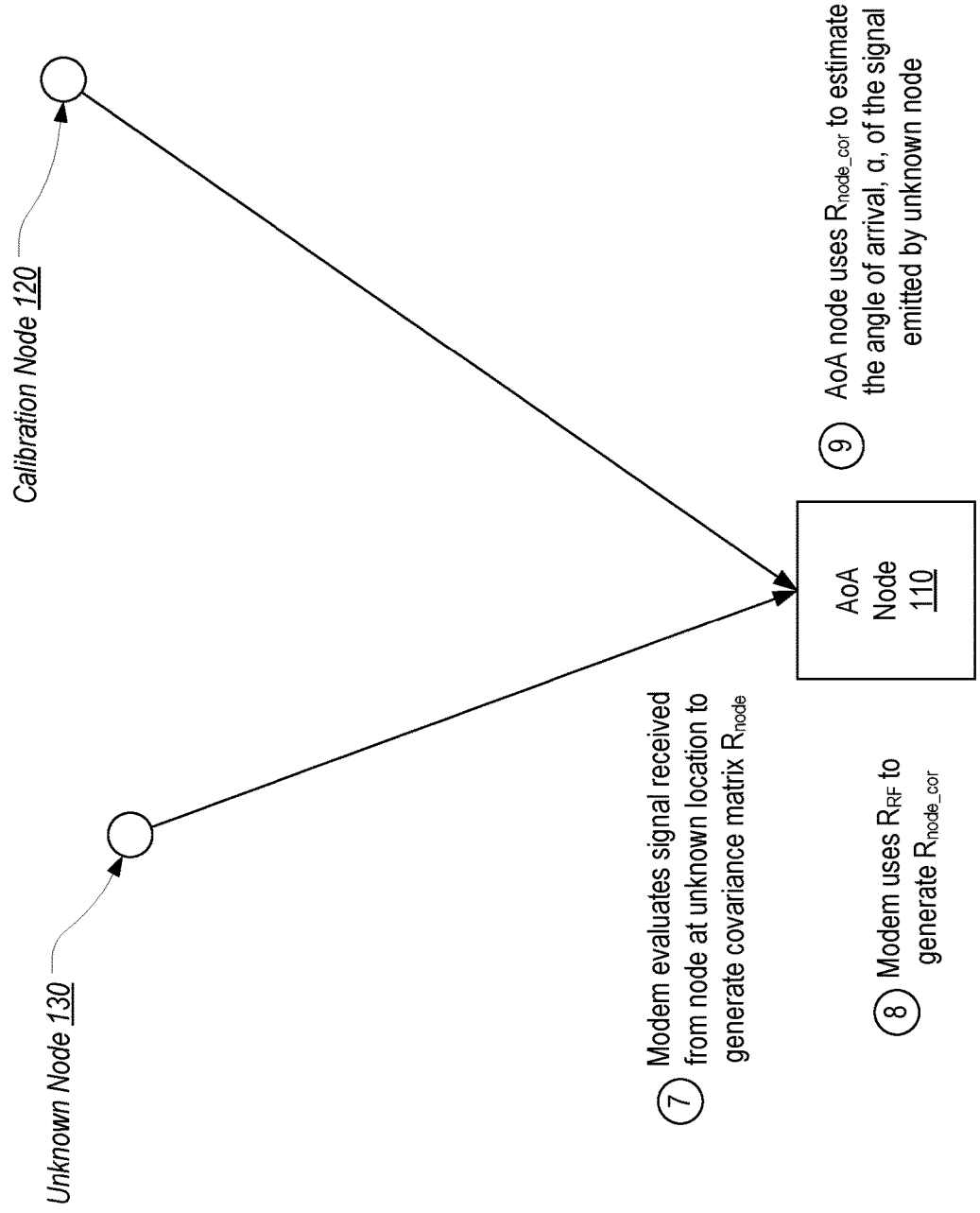

FIGS. 3A-3C provide a step-by-step illustration of the self-calibration process in accordance with some embodiments of the present invention. It is noted that the steps do not necessary need to be performed in order as indicated below. In step 1, shown in FIG. 3A, modem 113 is preconfigured with the relative locations of each antenna 111a in antenna array 111. As mentioned above, antennas 111a could be arranged in many different patterns/orientations. The exact pattern/orientation is not essential to the invention as long as modem knows the relative location of each antenna 111a. Also, these locations are relative to the boresight vector of antenna array 111. Step 1 could be performed at any time including prior to or after mounting angle of arrival node 110 at a desired location.

In step 2, any suitable technique could be employed to determine the location of calibration node 120 relative to the boresight vector of antenna array 111. For example, a physical survey could be performed to identify the angle between the antenna(s) of calibration node 120 and antenna array 111. Step 2 can preferably be performed after calibration node 120 and antenna array 111 have been mounted/located in their intended operating positions so that very precise measurements can be made. However, step 2 could be performed once the intended positions are known even if one or both of the nodes have not yet been installed.

In step 3, the location of calibration node 120 can be inputted to modem 113. More particularly, the azimuth and elevation angles of the antenna(s) of calibration node 120 relative to the boresight vector of antenna array 111 which were determined in step 2 can be provided to modem 113 in any suitable manner (e.g., via a user interface on angle of arrival node 110, via a communication link with angle of arrival node 110, etc.). Steps 2 and 3 could be repeated as necessary whenever calibration node 120 and/or angle of arrival node 110 are repositioned.

Turning now to FIG. 3B, angle of arrival node 110 can commence receiving a signal emitted by calibration node 120. In step 4, modem 113 can evaluate the signal emitted by calibration node 120 to generate the covariance matrix $R_{cal}$. Because of steps 2 and 3, modem 113 will know the precise angle at which this signal from calibration node 120 is received at each of antennas 111a and can therefore calculate $R_\alpha$ in step 5. It is noted, however, that step 5 could be performed any time after step 3 even if step 4 has not been performed.

In step 6, modem 113 can employ $R_{cal}$ which was measured in step 4 and $R_\alpha$ which was calculated in step 5 to calculate $R_{RF}$. Modem 113 can be configured to repeatedly perform steps 4 and 6 so that $R_{RF}$ reflects the phase rotation that is currently being caused by RF chain 112.

In conjunction with steps 4 and 6 and whenever it is desired to geolocate unknown node 130 (e.g., whenever unknown node 130—which may be an aircraft, a vehicle, or any other moving object that emits a signal for geolocation purposes—is in the field of view of antenna array 111), modem 113 can evaluate the signal emitted by unknown node 130 to produce covariance matrix $R_{node}$ as shown in step 7 of FIG. 3C.

In step 8, modem 113 calculates $R_{node\_cor}$ by employing $R_{RF}$ to remove the effects of the phase rotation caused by RF chain 112 from $R_{node}$. Preferably, the version of $R_{RF}$ employed in step 8 will have been recently calculated so that it reflects the phase rotation that is currently being caused by RF chain 112. For example, modem 113 can concurrently perform steps 6 and 8.

Finally, in step 9, angle of arrival node 110 can employ the corrected covariance matrix, $R_{node\_corr}$, in any suitable angle of arrival algorithm to estimate the angle of arrival, α, of the signal emitted by unknown node 130. Because the effects of RF chain 112 are removed from $R_{node\_corr}$, α will be a highly accurate estimate of the actual angle to unknown node 130.

With α0 known, the geolocation of unknown node 130 can be determined in any suitable manner. For example, angle of arrival system 100 may include or be interfaced with time (or time difference) of arrival components which can be used to determine the distance between unknown node 130 and angle of arrival node 110. Alternatively, multiple angle of arrival nodes may be employed to generate intersecting vectors to define the geolocation of unknown node 130. In any case, the exact method by which the geolocation of unknown node 130 may ultimately be determined is not essential to the present invention. However, by enabling the angle of arrival, α, to be precisely estimated, the present invention allows any geolocation technique that employs angle of arrival to be performed more accurately.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by an angle of arrival node in an angle of arrival system, for self-calibrating using a calibration node to thereby enable estimating an angle of arrival of a signal emitted by a node at an unknown location, the method comprising:
   receiving, at each of a plurality of antennas of an antenna array, a first signal emitted by a calibration node having a known location relative to the antenna array, the antennas being coupled to a modem via an RF chain;
   generating, by the modem, a first covariance matrix representing phase differences of the first signal received at each of the antennas;
   based on the known location of the calibration node, calculating a correction matrix that represents phase rotation caused by the RF chain;
   receiving, at each of the plurality of antennas of the antenna array, a second signal emitted by a node at an unknown location;
   generating, by the modem, a second covariance matrix representing phase differences of the second signal received at each of the antennas; and
   applying the correction matrix to the second covariance matrix to remove the phase rotation caused by the RF chain.

2. The method of claim 1, wherein calculating the correction matrix comprises:
   calculating a first component of the first covariance matrix that represents phase differences caused by a known angle of arrival of the first signal; and
   applying the first component to the first covariance matrix to produce a second component of the first covariance matrix that represents the phase rotation caused by the RF chain.

3. The method of claim 2, wherein applying the first component to the first covariance matrix comprises performing an element by element product of the first covariance matrix and the conjugate of the first component.

4. The method of claim 2, wherein the first component is calculated using a known position of each antenna in the antenna array and the known location of the calibration node.

5. The method of claim 2, wherein calculating the correction matrix further comprises:
   creating a vector from a first column of the second component;
   normalizing each element in the vector;
   multiplying the normalized vector with the conjugate transpose of the normalized vector; and
   conjugating the results of the multiplication.

6. The method of claim 1, further comprising:
   receiving input that defines the known location of the calibration node.

7. The method of claim 1, wherein the known location of the calibration node is relative to a boresight vector of the antenna array.

8. The method of claim 7, wherein the known location comprises an elevation angle and an azimuth angle relative to the boresight vector of the antenna array.

9. The method of claim 1, further comprising:
   employing the corrected second covariance matrix to estimate an angle of arrival of the second signal.

10. The method of claim 1, further comprising:
    updating the correction matrix to reflect a change in the phase rotation caused by the RF chain; and
    applying the updated correction matrix to another covariance matrix that is generated to represent phase differences of the second signal received at a later time at each of the antennas.

11. The method of claim 1, wherein the first signal is repeatedly received and the correction matrix is repeatedly updated to reflect updates to the first covariance matrix that occur as a result of changes in the phase rotation caused by the RF chain.

12. The method of claim 1, wherein the node at the unknown location comprises an aircraft, a vehicle, a projectile, or an individual.

13. A self-calibrating angle of arrival system comprising:
    an angle of arrival node that includes an antenna array, a modem, and an RF chain that couples each antenna of the antenna array to the modem; and
    a calibration node that is configured to emit a first signal for reception by the antenna array, the calibration node having a known location relative to the antenna array;
    wherein the angle of arrival node is configured to self-calibrate using the calibration node to thereby enable a precise estimation of an angle of arrival of a second signal emitted by a node at an unknown location by performing the following:
       receiving, at each of the antennas of the antenna array, the first signal emitted by the calibration node;
       generating, by the modem, a first covariance matrix representing phase differences of the first signal received at each of the antennas;
       based on the known location of the calibration node, calculating a correction matrix that represents phase rotation caused by the RF chain;
       receiving, at each of the antennas of the antenna array, the second signal emitted by the node at the unknown location;
       generating, by the modem, a second covariance matrix representing phase differences of the second signal received at each of the antennas; and
       applying the correction matrix to the second covariance matrix to remove the phase rotation caused by the RF chain.

14. The angle of arrival system of claim 13, wherein the angle of arrival node generates the correction matrix by:
    generating a calibration covariance matrix representing phase differences of the first signal received at each of the antennas;
    calculating a first component of the calibration covariance matrix that represents phase differences caused by a known angle of arrival of the first signal; and
    applying the first component to the calibration covariance matrix to produce a second component of the calibration covariance matrix that represents the phase rotation caused by the RF chain.

15. The angle of arrival system of claim 14, wherein the angle of arrival node generates the correction matrix by:
    creating a vector from a first column of the second component;
    normalizing each element in the vector;
    multiplying the normalized vector with the conjugate transpose of the normalized vector; and
    conjugating the results of the multiplication.

16. The angle of arrival system of claim 13, wherein the correction matrix is repeatedly generated to reflect a current phase rotation caused by the RF chain.

17. The angle of arrival system of claim 13, wherein the modem is configured to receive the known location of the calibration node as input.

18. A method, performed by an angle of arrival node in an angle of arrival system, for self-calibrating using a calibration node to thereby enable estimating an angle of arrival of a signal emitted by a node at an unknown location, the method comprising:
repeatedly receiving, at each of a plurality of antennas of an antenna array, a first signal emitted by a calibration node having a known location relative to the antenna array, the antennas being coupled to a modem via an RF chain;
repeatedly generating, by the modem, a first covariance matrix representing phase differences of the first signal received at each of the antennas;
based on the known location of the calibration node, repeatedly calculating a correction matrix that represents a current phase rotation caused by the RF chain;
receiving, at each of the plurality of antennas of the antenna array, a second signal emitted by a node at an unknown location;
generating, by the modem, a second covariance matrix representing phase differences of the second signal received at each of the antennas; and
applying the correction matrix that represents the current phase rotation caused by the RF chain to the second covariance matrix.

19. The method of claim 18, wherein calculating the correction matrix comprises:
identifying a first component of the first covariance matrix that represents phase differences caused by a known angle of arrival of the first signal; and
applying the first component to the first covariance matrix to obtain a second component of the first covariance matrix that represents the current phase rotation caused by the RF chain.

20. The method of claim 19, wherein the correction matrix is derived from the second component.

* * * * *